(12) United States Patent
Waye et al.

(10) Patent No.: US 12,194,794 B2
(45) Date of Patent: Jan. 14, 2025

(54) NOISE DAMPENER FOR A VEHICLE HITCH

(71) Applicant: AutoPacific Australia Pty Ltd, South Melbourne (AU)

(72) Inventors: Matthew Waye, Camden Park (AU); Matthew Reimers, Camden Park (AU); Huey Lam, Camden Park (AU)

(73) Assignee: AutoPacific Australia Pty Ltd, South Melbourne (AU)

( * ) Notice: Subject to any disclaimer, the term of this patent is extended or adjusted under 35 U.S.C. 154(b) by 519 days.

(21) Appl. No.: 17/506,389

(22) Filed: Oct. 20, 2021

(65) Prior Publication Data

US 2022/0126636 A1 Apr. 28, 2022

Related U.S. Application Data

(60) Provisional application No. 63/105,350, filed on Oct. 25, 2020.

(51) Int. Cl.
| | | |
|---|---|---|
| *B60D 1/24* | (2006.01) | |
| *B60D 1/32* | (2006.01) | |
| *B60D 1/46* | (2006.01) | |
| *B60D 1/60* | (2006.01) | |

(52) U.S. Cl.
CPC .............. *B60D 1/241* (2013.01); *B60D 1/32* (2013.01); *B60D 1/46* (2013.01); *B60D 1/60* (2013.01)

(58) Field of Classification Search
CPC ............. B60D 1/60; B60D 1/241; B60D 1/32
See application file for complete search history.

(56) References Cited

U.S. PATENT DOCUMENTS

| | | | | |
|---|---|---|---|---|
| 4,131,296 | A * | 12/1978 | Strader | B60D 1/34 280/485 |
| 8,833,791 | B2 * | 9/2014 | Prescott | B60D 1/07 280/506 |
| 8,910,964 | B2 * | 12/2014 | Bogoslofski | B60R 9/06 280/515 |
| 11,066,022 | B1 * | 7/2021 | Shen | B60R 9/06 |
| 2007/0262563 | A1 * | 11/2007 | Williams | B60D 1/241 280/506 |
| 2015/0076793 | A1 * | 3/2015 | Belinky | B60D 1/605 280/506 |
| 2019/0255897 | A1 * | 8/2019 | Spooner | B60D 1/241 |
| 2023/0098346 | A1 * | 3/2023 | Motzing | B60D 1/241 280/506 |

* cited by examiner

*Primary Examiner* — Kevin Hurley
*Assistant Examiner* — Hosam Shabara
(74) *Attorney, Agent, or Firm* — Todd Martin

(57) ABSTRACT

A noise dampener that includes a dampener body; a hinged lever connected to the body and moveable between an engaged position and a disengaged position; a plunger cooperatively engaged with the lever, the plunger having a dedicated hitch engagement surface; and a fastening means configured to fasten the lever and plunger to an exterior surface of the hitch. The lever is operable to move the plunger in a vertical up and down movement so that the hitch engagement surface presses against an exterior surface of attachment arm inserted into the hitch.

11 Claims, 8 Drawing Sheets

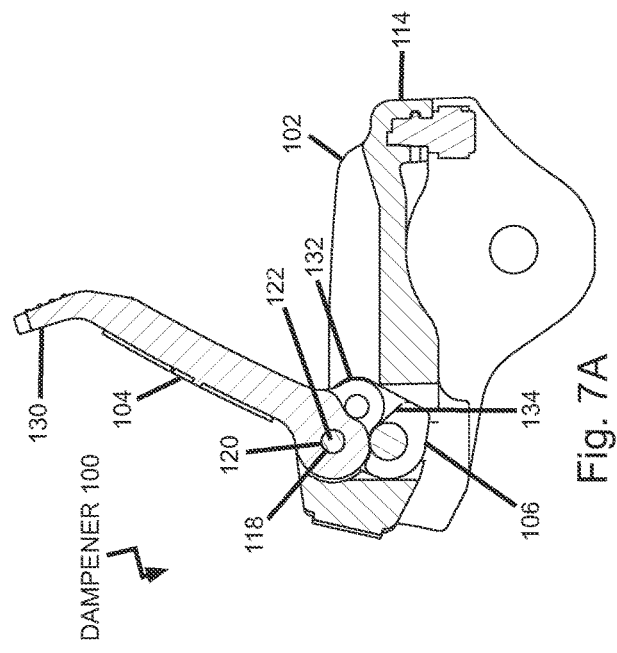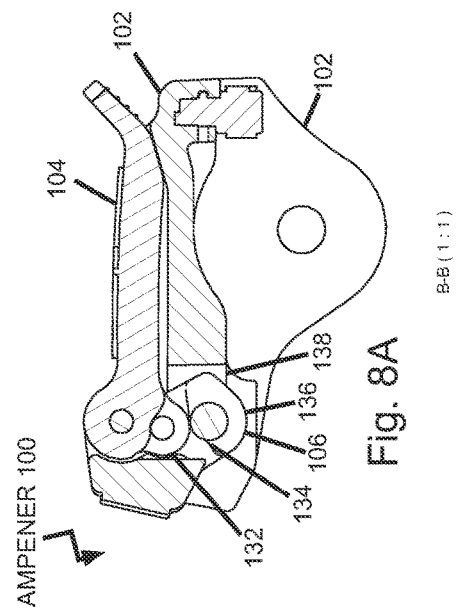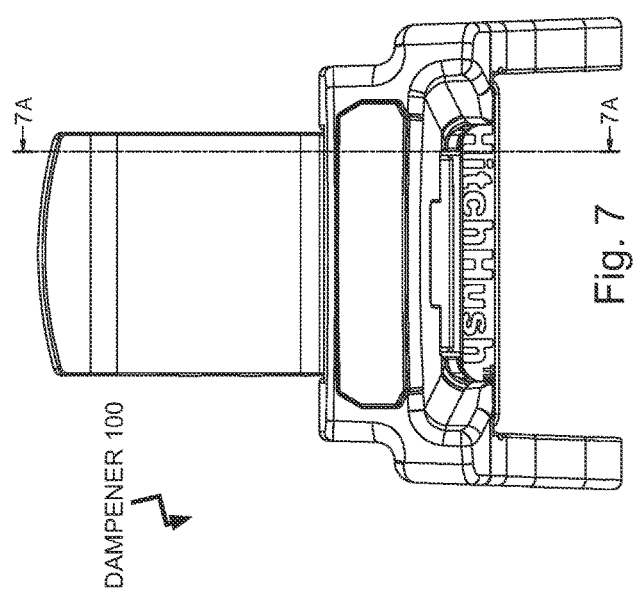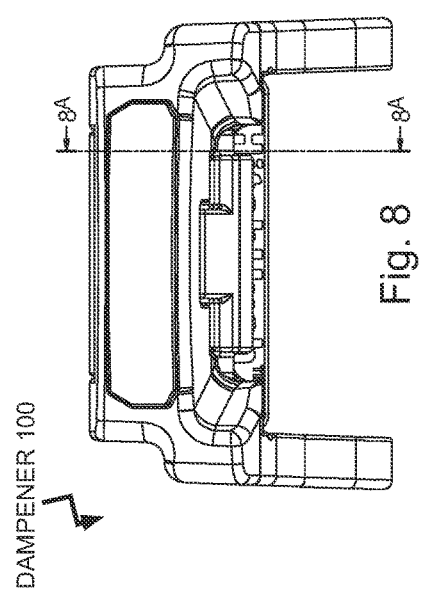

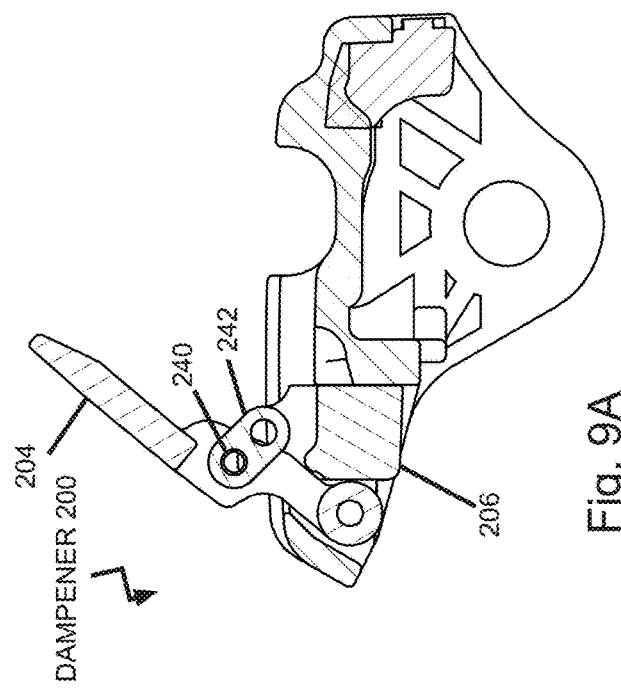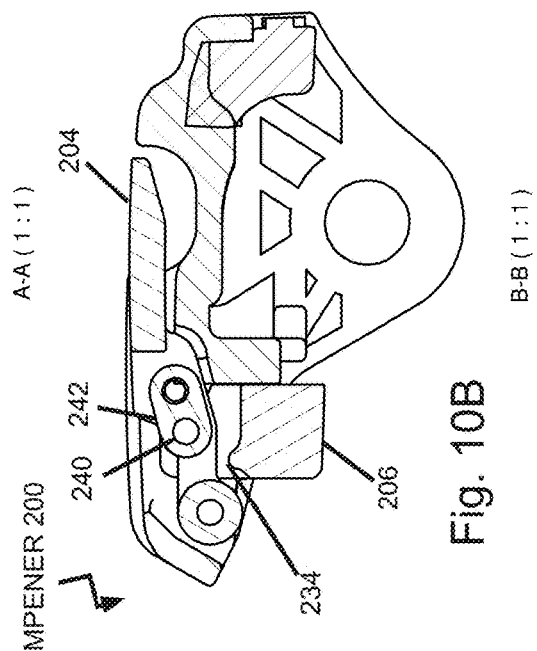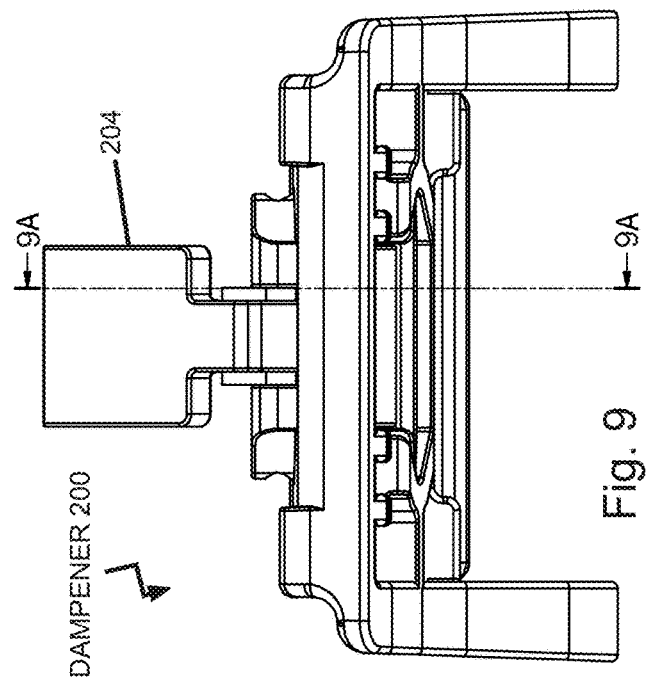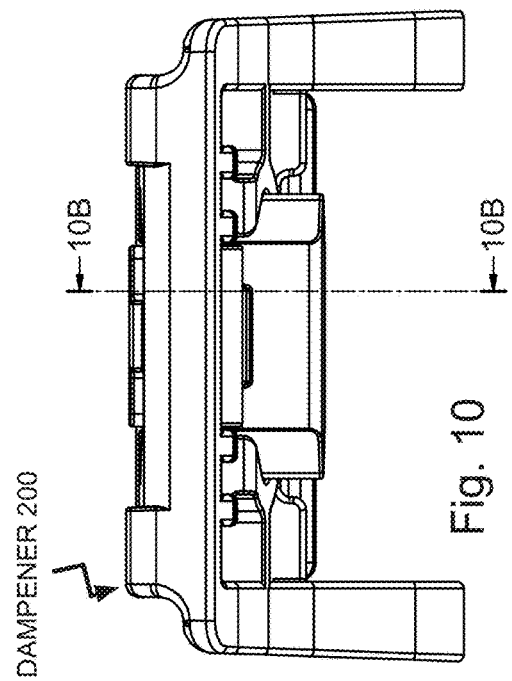

NOISE DAMPENER FOR A VEHICLE HITCH

CROSS-REFERENCE TO RELATED APPLICATION(S)

This application claims priority to and any benefit of U.S. Provisional Application No. 63/105,350, filed Oct. 25, 2020, the content of which is incorporated herein by reference in its entirety.

FIELD OF THE INVENTION

The present disclosure relates to improvements in devices designed to dampen rattles and other noises in a vehicle hitch when engaged with items such as a sporting equipment rack and general towing applications.

BACKGROUND OF THE INVENTION

When engaging items such as a bicycle carrier to a hitch, movement of the vehicle over varying surface roughness causes the bicycle carrier to rattle against the hitch, creating noise and leading to wear of the carrier arm inserted into the hitch. The noise caused by the contact between the hitch and attachment arm can be quite loud at times, occasionally distracting a driver worried about the securement of their items to the carrier. Excessive movement and swaying of the carrier can also be highly distracting to a driver.

Attempts have been made to try to lessen such noise and excess movement/swaying, but such attempts are difficult to implement, or are prone to contamination from debris interfering with engagement or noise dampening, particularly when the vehicle is involved in off-road travel. Accordingly, there exists a need to provide an improved noise dampening device less prone to interference from debris, and easier to use than conventional arrangements.

SUMMARY

The present disclosure in one preferred aspect provides for a noise and anti-swaying dampener for a vehicle hitch. The noise dampener includes a dampener body; a hinged lever connected to the body and moveable between an engaged position and a disengaged position; a plunger cooperatively engaged with the lever, the plunger having a dedicated hitch engagement surface; and a fastening means configured to fasten the lever and plunger to an exterior surface of the hitch. The lever is operable to move the plunger in a vertical up and down movement so that the hitch engagement surface presses against an exterior surface of attachment arm inserted into the hitch.

In another preferred aspect, the present invention provides a method for attaching an attachment arm to a hitch, comprising: swivelling a closure cap from a closed position to an open position; inserting an attachment arm into the hitch while the closure cap is in the open position; rotating a lever on the closure cap to engage the plunger against a surface of the attachment arm.

It is to be understood that both the foregoing general description and the following detailed description are exemplary and explanatory only and are not restrictive of the invention, as claimed. In the present specification and claims, the word "comprising" and its derivatives including "comprises" and "comprise" include each of the stated integers but does not exclude the inclusion of one or more further integers.

It will be appreciated that reference herein to "preferred" or "preferably" is intended as exemplary only. The claims as filed and attached with this specification are hereby incorporated by reference into the text of the present description.

The accompanying drawings, which are incorporated in and constitute a part of this specification, illustrate several embodiments of the invention and together with the description, serve to explain the principles of the invention.

BRIEF DESCRIPTION OF THE FIGURES

FIG. 7 is a proximal vehicle-facing end view of the noise and anti-swaying dampener of FIG. 5 with the lever and plunger in an unengaged position.

FIG. 7A is a cross sectional side view of the noise and anti-swaying dampener of FIG. 7 taken along line 7A-7A of FIG. 7.

FIG. 8 is a proximal vehicle-facing end view of the noise and anti-swaying dampener of FIG. 5 with the lever and plunger in an engaged position.

FIG. 8A is a cross sectional side view of the noise and anti-swaying dampener of FIG. 5 taken along line 8A-8A of FIG. 8.

FIG. 9 is a distal end view of a noise and anti-swaying dampener with similar hinged-like engagement in accordance with another preferred embodiment of the present disclosure, the noise and anti-swaying dampener being shown with its lever raised in an unengaged position.

FIG. 9A is a cross sectional side view of the noise and anti-swaying dampener of FIG. 9 taken along line 9A-9A of FIG. 9.

FIG. 10 is a distal vehicle-facing end view of the noise and anti-swaying dampener of FIG. 9 with the lever and plunger in an engaged position FIG. 10B is a cross sectional side view of the noise and anti-swaying dampener of FIG. 9 taken along line 10B-10B of FIG. 10.

DETAILED DESCRIPTION OF THE DRAWINGS

Reference will now be made in detail to the present preferred embodiments of the invention, examples of which are illustrated in the accompanying drawings.

Figure 1:
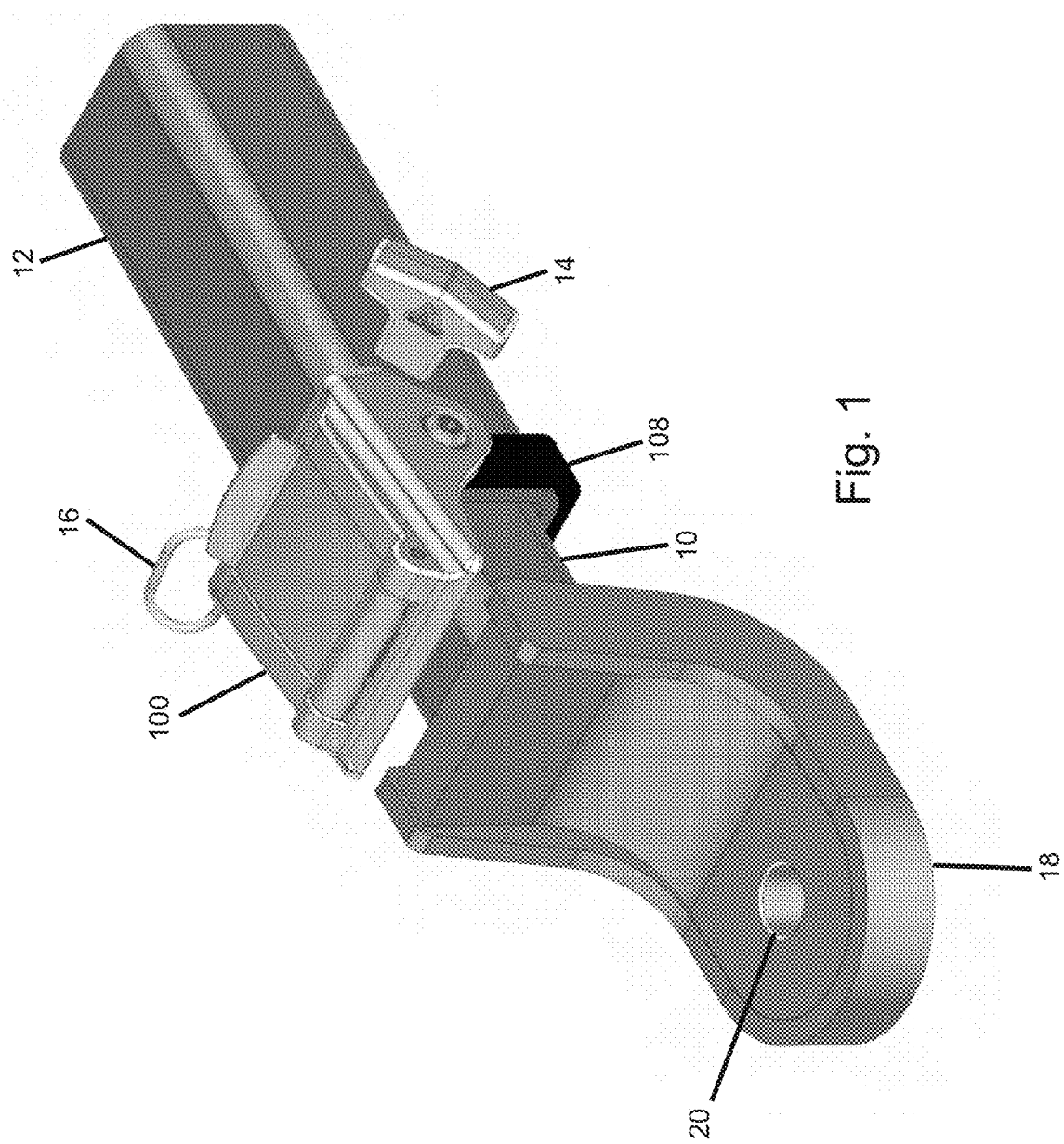
FIG. 1 is a partial perspective side view of a noise and anti-swaying dampener engaged with a carrier attachment arm inserted into a vehicle hitch in accordance with a preferred embodiment of the present disclosure.
Figure 2:
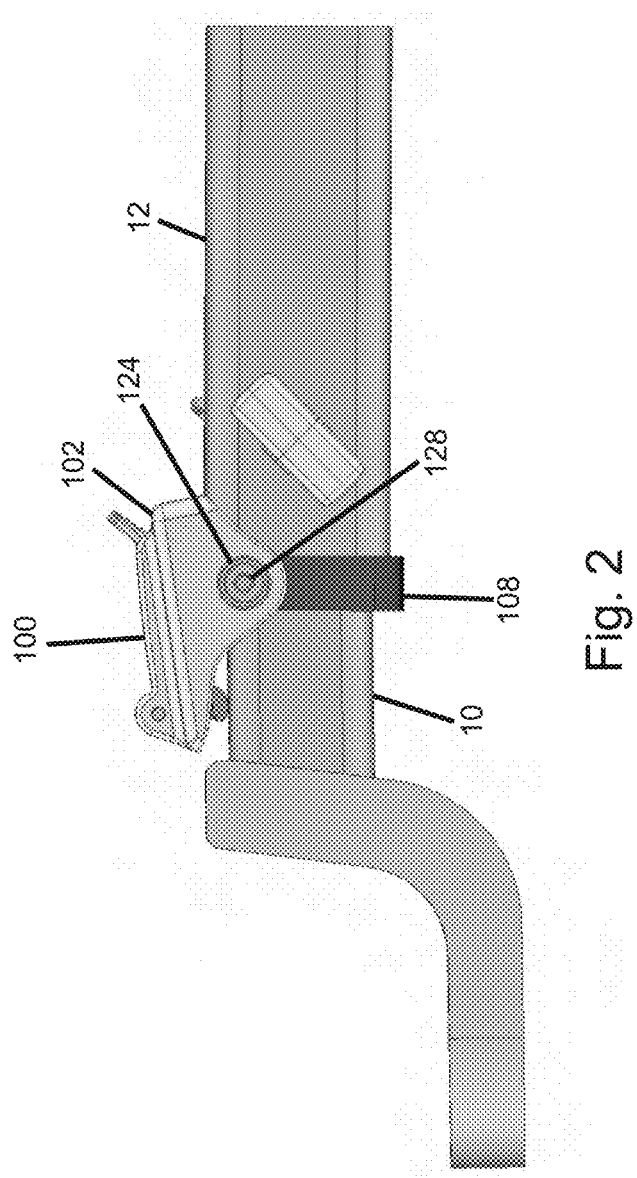
FIG. 2 is a side elevation view of the noise and anti-swaying dampener, attachment arm, and hitch of FIG. 1.

FIGS. 1 to 8A show a preferred embodiment of a noise and anti-swaying dampener 100 for minimising noise between an attachment arm 10 of a sports equipment carrier or ball attachment, and a vehicle hitch 12. In a preferred aspect, dampener 100 doubles as a pivotal closure cap, as will be described further below. Dampener 100 includes a dampener body 102, a lever or handle 104 connected to the dampener body, a plunger 106 connected to the dampener body, and a fastening means 108 that in a preferred aspect shown in FIGS. 1 and 2, is in the form of a circumferential collar. The preferred elements of dampener 100 and their interrelationship are described below.

As shown in FIG. 1, attachment arm 10 includes a portion 18 with an aperture 20 sized and configured to receive a conventional ball mount. The use of a ball mount in carrying/towing items would be well-understood by those in the field, and for simplicity, such details are not repeated here.

Figure 5:
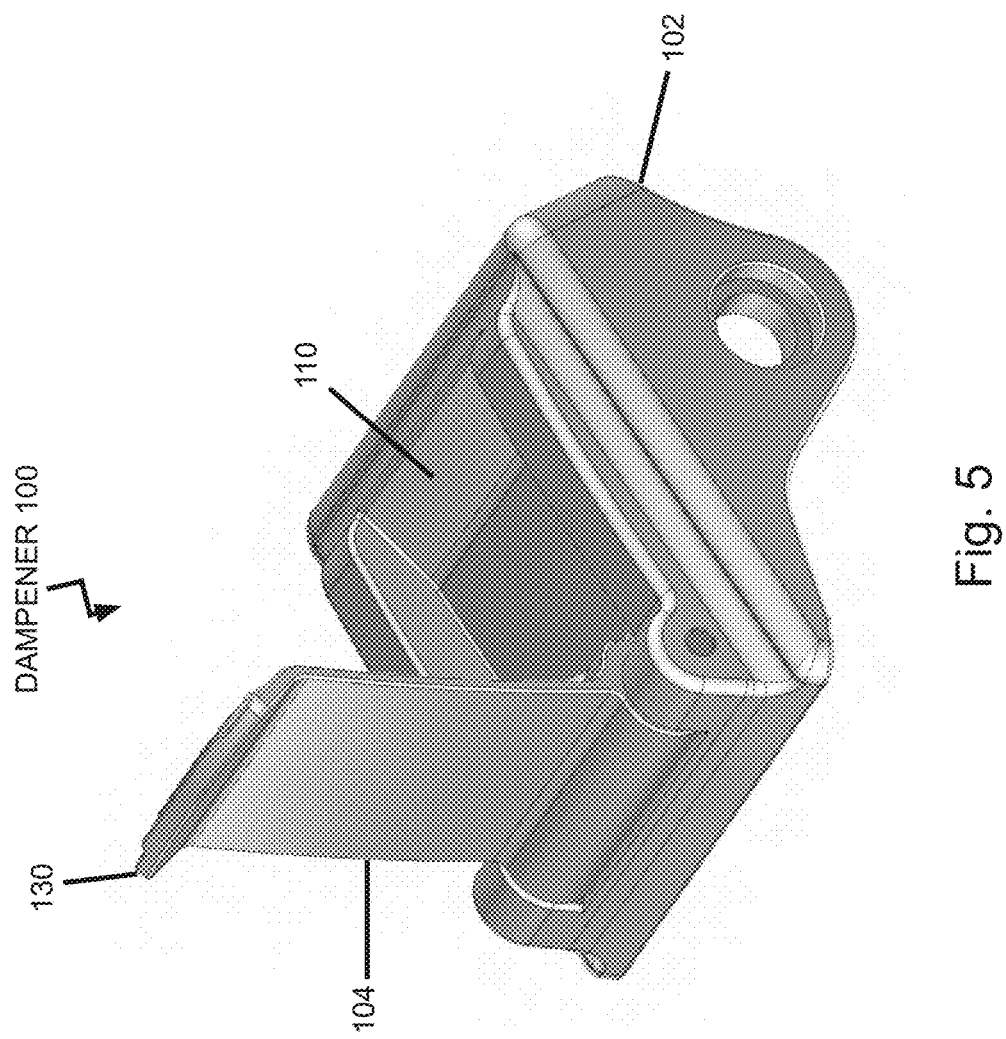
FIG. 5 is an upper perspective view of the noise and anti-swaying dampener of FIG. 1.
Figure 6:
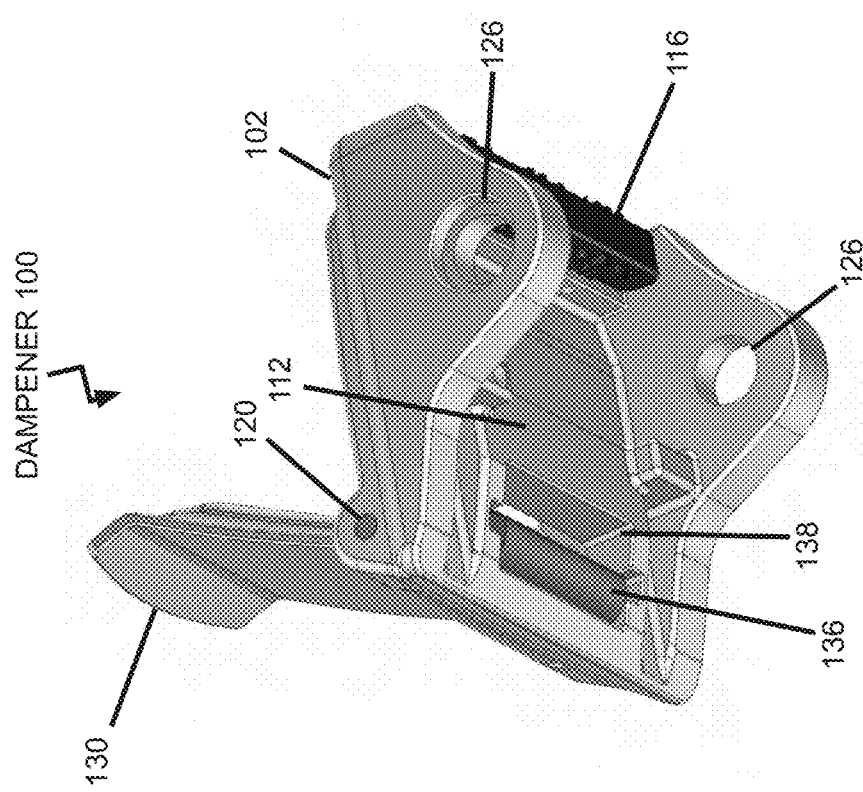
FIG. 6 is a bottom perspective view of the noise and anti-swaying dampener of FIG. 5.

Referring to FIGS. 1, 2, 5, 6, and 7A, body 102 of dampener or cap 100 includes an upper surface 110, a lower surface 112, and a vehicle-facing end 114. Cap 100 preferably has a width larger than the typical width of a standard hitch. Cap 100 has a hitch engagement surface 116 on lower surface 112, as shown in FIG. 6. Cap 100 includes a handle pivot point 118 (FIG. 7A) having opposed pivot apertures 120 (FIG. 6) sized and configured to receive a pivot arm 122 (FIG. 7A) of lever 104 along a rotation axis through the apertures 120.

As shown in FIGS. 2 and 6, cap body 102 further includes a collar pivot point 124 having a pair of opposed pivot apertures 126 sized and configured to receive respective pivot arms 128 of collar 108. Engagement of collar pivot arms 128 with pivot apertures 126 permits the cap to open and close at least 90 degrees about a pivot or rotation axis connecting and running through pivot apertures 126. The axis extending through pivot apertures 120 represents a first axis of rotation, and the axis extending through pivot apertures 126 represents a second axis of rotation, where the first and second axes are offset from one another as shown in FIG. 6.

FIGS. 5 and 6 show handle or lever 104 having an arm engagement tab 130 at a distal free end thereof. Tab 130 is at an acute angle relative to the majority of lever 104.

Referring now to FIGS. 7A and 8A, lever 104 includes a bulbous portion 132 at its proximal end. Bulbous portion 132 is sized and configured to slidably engage with an engagement surface 134 of plunger 106. Plunger 106 preferably includes a fungible hitch engagement surface 136 configured to compress against the exterior of attachment arm 10. Engagement surface 136 preferably has a maximum length approximately equal to a maximum width of cap body 102. Cap body 102 further includes a plunger channel 138 sized and configured to accommodate the movement of plunger 106 therethrough.

Preferably, plunger 106 is configured for only vertical up and down movement within channel 138. Plunger 106 is further preferably configured with an over-centre locking shape so that an upward force exerted on lever 104 to disengage the plunger from the hitch is initially resisted.

As the plunger moves vertically downward, forcing the body 102 to pivot about the axis of 124 and thus creating a compressive force between 116 and hitch 12 resulting the indented dampening effect on carrier attachment arm.

Cap 100 and any one or more of its associated components may be constructed from a variety of materials, for example, plastic, metal, carbon fibre, or a material such as polyurethane.

Figure 3:
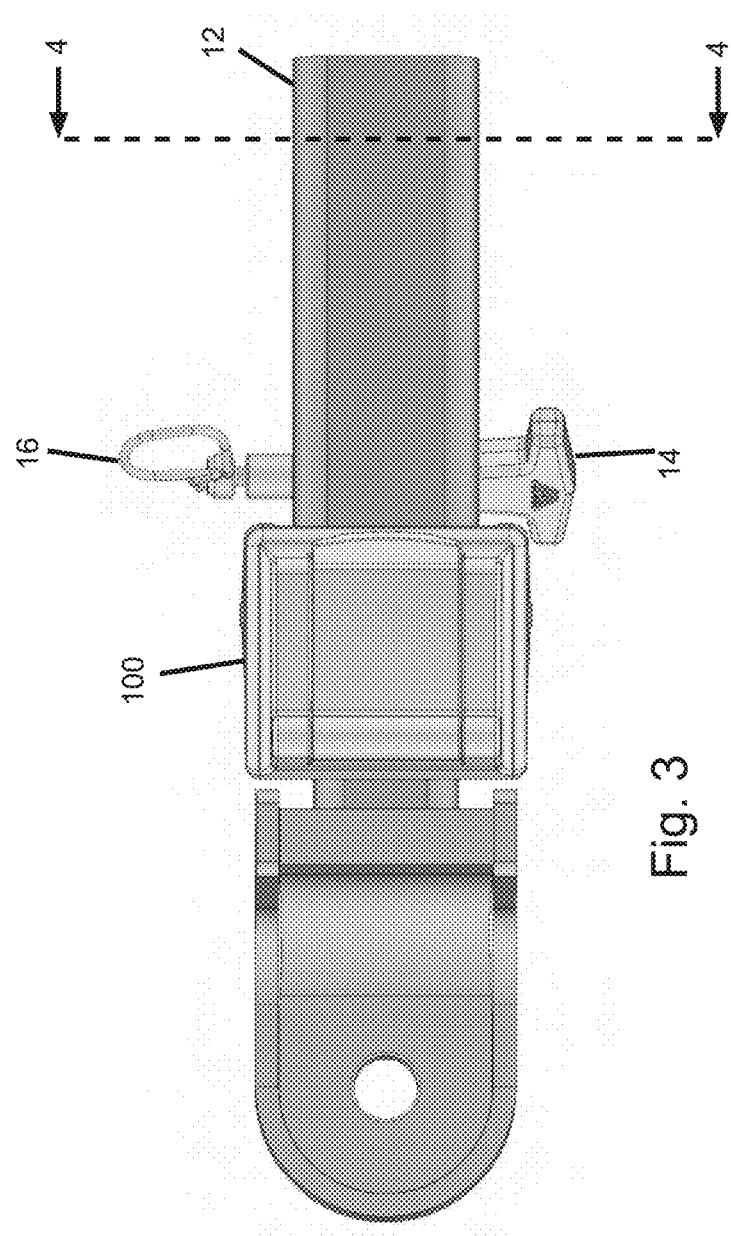
FIG. 3 is a top plan view of the noise and anti-swaying dampener, attachment arm, and hitch of FIG. 1.
Figure 4:
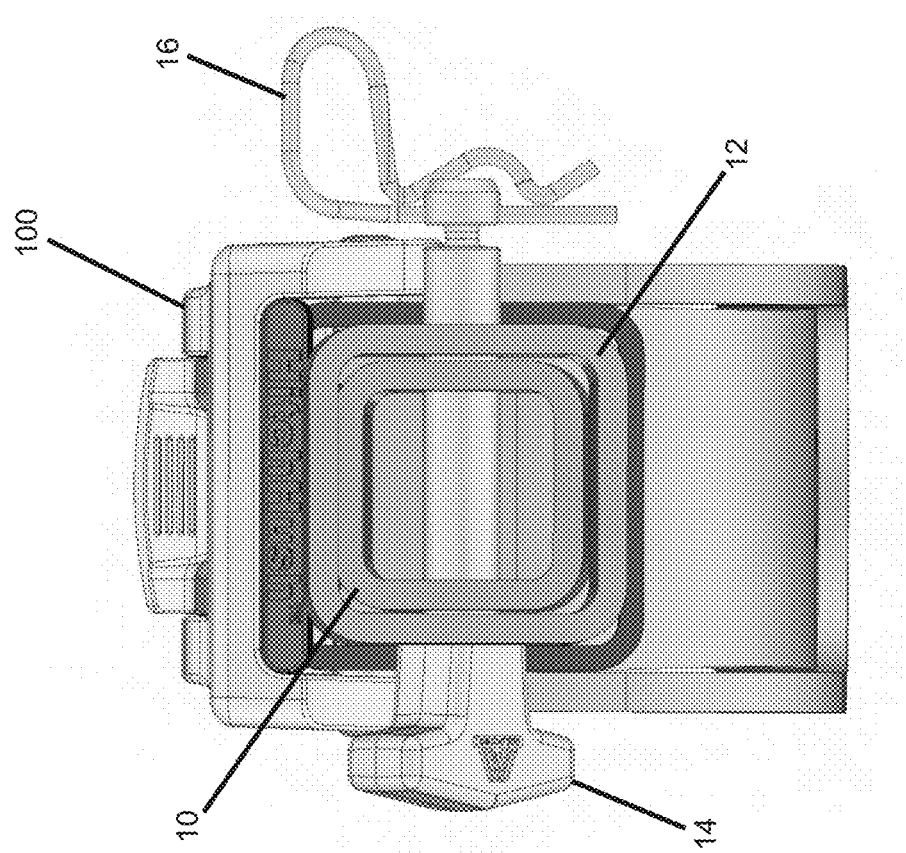
FIG. 4 is a cross sectional end view of the noise and anti-swaying dampener, attachment arm, and hitch of FIG. 1, taken along line 4-4 of FIG. 3.

Referring to FIGS. 1, 2, 3, 6, 7A and 8A, in use, cap body 102 may come already engaged with hitch 12, or may attach to hitch 12 by sliding body 102 over hitch 12. Once about the outer surface of hitch 12, cap 100 may be moved or swivelled from a closed position covering the open end of hitch 12, to an open potion where the length of body 102 is roughly parallel to the top of hitch 12, exposing the open end of the hitch. Thereafter, a user may slide an attachment arm 10, such as a carrier attachment arm into the open end of the hitch until apertures in the attachment arm are aligned with apertures in the hitch. An engagement pin 14 is then slid through the corresponding apertures. Once pin 14 has been inserted through the apertures, a locking pin 16 is inserted through a distal end of the engagement pin 14 to lock and secure the engagement pin in position as shown in FIG. 3.

Closure cap 100 is engaged to dampen the rattle or noise between attachment arm 10 and hitch 12 by moving, rotating or swivelling arm 104 so that distal end 130 moves toward vehicle-facing end 114. Referring to FIGS. 7A and 8A, the rotation of lever 104 results in the movement of bulbous portion 132 so that bulbous portion 132 engages or slides with plunger engagement surface 134 to move plunger 106 partially out of plunger channel aperture 138 until fungible hitch engagement surface 136 compresses against the exterior surface of the attachment arm while the attachment arm is engaged with the hitch.

It will be appreciated that the steps described above may be performed in a different order, varied, or some steps omitted entirely without departing from the scope of the present description.

Referring now to FIGS. 9 to 10B, a noise dampener 200 is shown in accordance with another preferred embodiment of the present description. Dampener 200 is similar to dampener 100 except that lever 204 is about one half the width of lever 104, and plunger 206 is formed as a larger block-like piece that moves in a reciprocal, vertical up and down motion, preferably only vertical. Lever 204 includes a pivot point 240 interconnecting a moveable, rotatable extension flange 242. Flange 242 rotates to a position that is generally parallel to lever 204 when lever 204 is in its engaged position, as shown in FIG. 10B. In the unengaged position, shown in FIG. 9A, flange 242 rotates to a position where its length is roughly perpendicular to the horizontal plane of lever 204. Thus, pivot point 240 represents a third axis of rotation parallel, but offset to the first and second axes of rotation described above in the embodiment of FIGS. 1-8A.

Continuing to refer to FIGS. 9A and 10B, the rotation of lever 204 results in the movement of flange 242 so that flange 242 engages or slides with plunger engagement surface 234 to move plunger 206 partially out of the plunger channel aperture until a fungible hitch engagement surface compresses against the exterior surface of the attachment arm while the attachment arm is engaged with the hitch.

The foregoing description is by way of example only, and may be varied considerably without departing from the scope of the present invention. For example only, placement of the cap may be positioned on other areas around the hitch, for example, along the side or bottom of the hitch. The plunger may be configured to engage with the attachment arm via a horizontal slidable incremental ratcheted mechanism as an alternative to any cam-like mechanism such that no rotation is needed to engage the noise dampener with the carrier arm and the hitch. Such a ratcheted mechanism may include a quick release to disengage the ratchet for easily disengaging the noise dampener.

The features described with respect to one embodiment may be applied to other embodiments, or combined with or interchanged with the features of other embodiments, as appropriate, without departing from the scope of the present invention.

The present disclosure in a preferred form provides the advantages of effective noise reduction and reduction of parts wear that is often inherent often with other attempts to reduce noise in a hitch.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A noise and anti-swaying dampener for a vehicle hitch, comprising:
   a dampener body;
   a lever pivotally connected to said body and moveable between an engaged position and a disengaged position, said lever being configured to rotate relative to said dampener body about a first rotation axis at said dampener body;
   a plunger cooperatively engaged with said lever, said plunger having a fungible hitch engagement surface; and
   a fastening means configured to fasten said lever and plunger to an exterior surface of the hitch, said lever being operable to move said plunger so that said hitch engagement surface presses against an exterior surface of attachment arm inserted into said hitch, said dampener body being configured to rotate relative to said fastening means about a second rotation axis at said dampener body, the first and second rotation axes being parallel and offset from one another.

2. The noise dampener of claim 1, wherein said fastening means is a collar configured to wrap around the exterior of the hitch to secure said lever and plunger to the outside of the hitch.

3. The noise dampener of claim 1, wherein said fastening means is a collar configured to wrap around the exterior of the hitch to secure said lever and plunger to top exterior surface of the hitch.

4. The noise dampener of claim 1, wherein said dampener body is pivotally connected to the fastening means to permit said dampener body to swivel approximately 90 degrees about a rotation axis relative to said fastening means.

5. The noise dampener of claim 1, wherein said dampener body forms a closure cap to close an end of the hitch when the hitch is not engaged with the attachment arm.

6. The noise dampener of claim 1, wherein said fungible hitch engagement surface has a maximum length approximately equal to a maximum width of said dampener body.

7. A method for attaching an attachment arm to a hitch, comprising: swivelling a closure cap from a closed position to an open position about a first rotation axis; inserting an attachment arm into the hitch while the closure cap is in the open position; and rotating a lever on the closure cap to engage a portion of the cap against a portion of the attachment arm about a second rotation axis, the first and second rotation axes being parallel and offset from one another, including downwardly moving a plunger against an exterior of the attachment arm.

8. The method of claim 7, wherein the downward movement of the plunger engages the attachment arm to dampen rattling and/or swaying motion between the hitch and the attachment arm while the attachment arm is engaged with the hitch.

9. The method of claim 7, wherein movement of the plunger is only in a vertical up and down direction.

10. The method of claim 7, further comprising initially resisting rotational movement of the lever before a positive continued movement of the lever disengages the plunger from the attachment arm.

11. The method of claim 7, wherein the closure cap is swivelled about a rotation axis so that the closure cap moves from closing the end of the hitch to covering a top surface of the hitch and attachment arm while the attachment arm is engaged to the hitch.

* * * * *